(12) United States Patent
Schmidt et al.

(10) Patent No.: US 10,750,572 B2
(45) Date of Patent: Aug. 18, 2020

(54) SFN INTER NODE MESSAGING

(71) Applicant: IPCom GmbH & Co. KG, Pullach (DE)

(72) Inventors: Andreas Schmidt, Braunschweig (DE); Achim Luft, Braunschweig (DE); Martin Hans, Bad Salzdetfurth (DE); Maik Bienas, Schoeppenstedt (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

(21) Appl. No.: 15/747,232

(22) PCT Filed: Aug. 4, 2016

(86) PCT No.: PCT/EP2016/068675
§ 371 (c)(1),
(2) Date: Jan. 24, 2018

(87) PCT Pub. No.: WO2017/021502
PCT Pub. Date: Feb. 9, 2017

(65) Prior Publication Data
US 2018/0227983 A1    Aug. 9, 2018

(30) Foreign Application Priority Data

Aug. 5, 2015    (EP) .................................... 15179851

(51) Int. Cl.
*H04W 84/20*    (2009.01)
*H04W 36/00*    (2009.01)
(Continued)

(52) U.S. Cl.
CPC ....... *H04W 84/20* (2013.01); *H04W 36/0027* (2013.01); *H04W 72/0426* (2013.01); *H04W 88/12* (2013.01); *H04W 92/20* (2013.01)

(58) Field of Classification Search
CPC .................................................... H04W 84/20
See application file for complete search history.

(56) References Cited

U.S. PATENT DOCUMENTS 8,868,671 B2    10/2014    Jo et al.
9,301,225 B2 *   3/2016    Comsa .............. H04W 52/0206
(Continued)

FOREIGN PATENT DOCUMENTS

EP    2045952 A2    4/2009
EP    2854450 A1    4/2015
(Continued)

OTHER PUBLICATIONS

International Search Report for International Application No. PCT/EP2016/068675, dated Oct. 18, 2016.

*Primary Examiner* — Andrew Lai
*Assistant Examiner* — Andrew C Lee
(74) *Attorney, Agent, or Firm* — Marshall, Gerstein & Borun LLP

(57) ABSTRACT

The invention provides a method of transferring resource control unit operational control functionality within a single frequency network, in which multiple transmission points transmit identical downlink data packets in a synchronized manner, from a first node to a second node, the method comprising receiving at a resource control unit a set of resource control information from at least one candidate node; determining using the resource control information a suitability of the at least one candidate node to be the second node; and initiating transfer of the resource control unit operational control functionality from the first node to the second node.

13 Claims, 11 Drawing Sheets

(51) Int. Cl.
*H04W 88/12* (2009.01)
*H04W 72/04* (2009.01)
*H04W 92/20* (2009.01)

(56) References Cited

U.S. PATENT DOCUMENTS

| | | | | |
|---|---|---|---|---|
| 9,713,148 | B2* | 7/2017 | Mochizuki | H04L 5/001 |
| 2008/0240145 | A1 | 10/2008 | Adamovsky et al. | |
| 2009/0264125 | A1 | 10/2009 | Rofougaran et al. | |
| 2010/0322227 | A1* | 12/2010 | Luo | H04L 5/0073 |
| | | | | 370/345 |
| 2011/0286407 | A1* | 11/2011 | Vajapeyam | H04W 72/12 |
| | | | | 370/329 |
| 2012/0135765 | A1 | 5/2012 | Khoo et al. | |
| 2013/0182555 | A1* | 7/2013 | Raaf | H04W 36/0033 |
| | | | | 370/216 |
| 2013/0183971 | A1* | 7/2013 | Tamaki | H04W 36/0061 |
| | | | | 455/436 |
| 2013/0242729 | A1* | 9/2013 | Chen | H04W 28/0289 |
| | | | | 370/230 |
| 2013/0272170 | A1* | 10/2013 | Chatterjee | H04W 28/08 |
| | | | | 370/280 |
| 2013/0301474 | A1 | 11/2013 | Suwa | |
| 2014/0016488 | A1* | 1/2014 | Xu | H04W 52/0206 |
| | | | | 370/252 |
| 2014/0036822 | A1* | 2/2014 | Maeda | H04W 52/244 |
| | | | | 370/329 |
| 2014/0226551 | A1* | 8/2014 | Ouchi | H04W 72/0473 |
| | | | | 370/311 |
| 2014/0295909 | A1* | 10/2014 | Ouchi | H04W 52/242 |
| | | | | 455/522 |
| 2014/0301371 | A1* | 10/2014 | Maeda | H04W 36/0016 |
| | | | | 370/331 |
| 2015/0092554 | A1* | 4/2015 | Mochizuki | H04W 24/10 |
| | | | | 370/235 |
| 2015/0289141 | A1* | 10/2015 | Ghasemzadeh | H04W 16/14 |
| | | | | 370/330 |
| 2015/0341803 | A1* | 11/2015 | Kim | H04W 16/02 |
| | | | | 370/252 |
| 2016/0028448 | A1* | 1/2016 | Park | H04B 7/26 |
| | | | | 375/267 |
| 2016/0036571 | A1* | 2/2016 | Park | H04B 7/024 |
| | | | | 370/330 |
| 2016/0105882 | A1* | 4/2016 | Park | H04B 7/024 |
| | | | | 370/329 |
| 2016/0165882 | A1* | 6/2016 | Jimenez | A01N 27/00 |
| | | | | 514/764 |
| 2016/0381690 | A1* | 12/2016 | Kim | H04L 5/0037 |
| | | | | 370/329 |

FOREIGN PATENT DOCUMENTS

| | | |
|---|---|---|
| RU | 2435333 C2 | 11/2011 |
| RU | 2447600 C2 | 4/2012 |
| RU | 2013129849 A | 1/2015 |
| WO | WO-2014139588 A1 | 9/2014 |

* cited by examiner

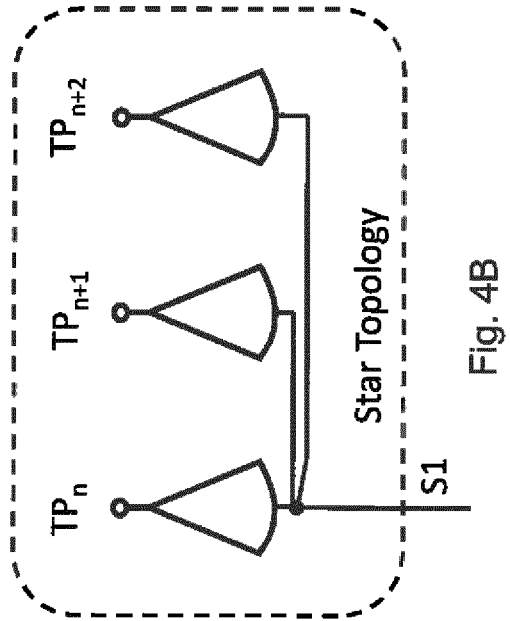
Fig. 4B Star Topology
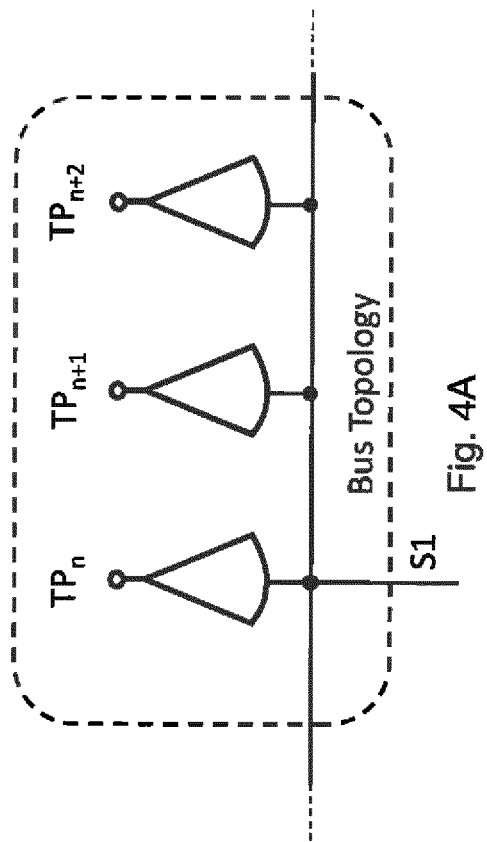
Fig. 4A Bus Topology
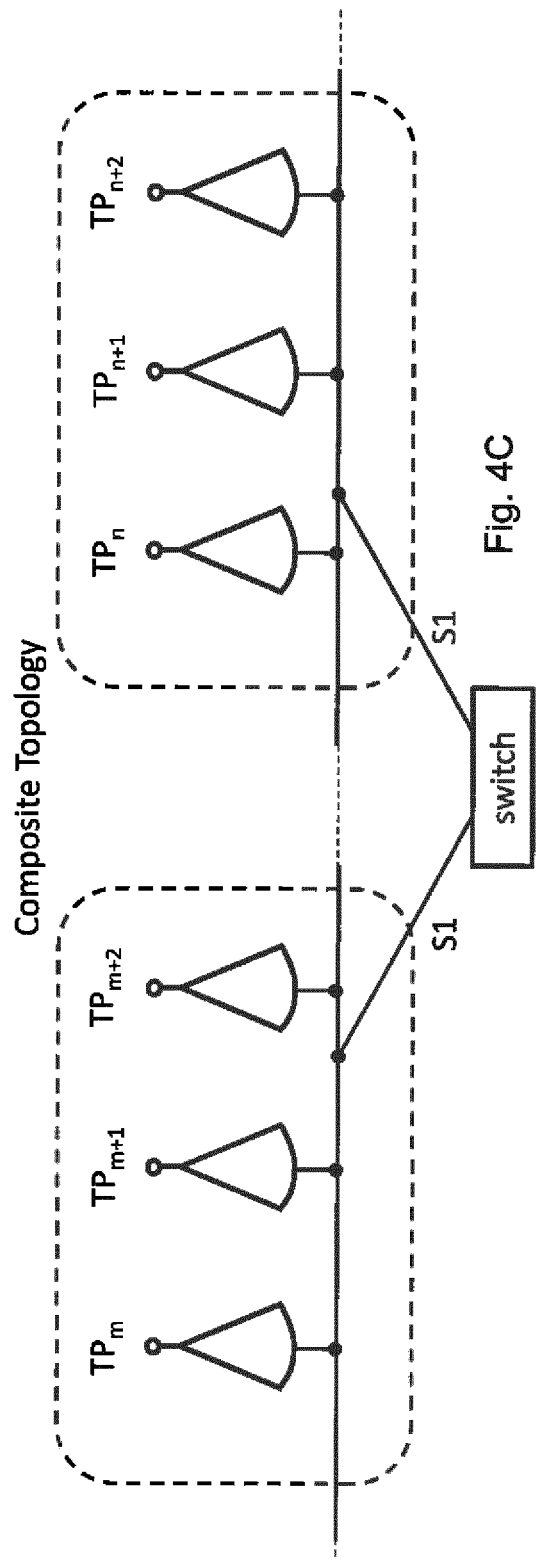
Fig. 4C Composite Topology

SFN INTER NODE MESSAGING

This is the United States national phase of International Patent Application No. PCT/EP2016/068675, filed Aug. 4, 2016, which claims the priority benefit of European Application No. 15179851.9, filed Aug. 5, 2015, the entire content of each of which is incorporated herein by reference.

RELATION TO EARLIER APPLICATIONS

The present invention is a further development of the arrangement described in European patent application number 15154705.6, filed on 11 Feb. 2015, entitled "Method and Device for Configuring a Single Frequency Network", the contents of which are incorporated herein by reference for all purposes.

BACKGROUND OF THE INVENTION

The invention relates to the operation of a single frequency network or network cluster in which multiple base stations, each providing one ore more radio cells, operate in a coordinated manner such that no handover is required when a user equipment traverses multiple cells.

In EP 15154705.6, a method for operating a Single Frequency Network (SFN) based on knowledge of positions and/or trajectories of mobile terminals is described. In brief, a Resource Control Unit (RCU) function is defined that may either be centrally located or allotted in various entities throughout the communication system. In one alternative, a resource pool with local scheduling, it was proposed to assign a first interference mitigation function (for mitigation of inter-SFN-Cluster interference) to a central RCU entity and a second interference mitigation function (for mitigation of intra-SFN-Cluster interference) to a local (or cluster specific) RCU entity. Furthermore it was described that the local RCU may comprise or control the scheduling functionality of the MAC layer of the air interface technology of the wireless communication system. In this concept the local RCU should "tell" all involved transmission points (eNBs or RRHs) in its respective SFN-Cluster when to send what portion of the data in a synchronous manner.

US 2009/0264125 A1 describes a communications system incorporating handheld units for providing femtocell operations. The handheld unit provides a plurality of radio interfaces to user equipment. The femtocell operates in a similar fashion as a regular cellular base station. Where more than one handheld units operate within a given area, femtocell access point functions may be redistributed between the handheld units.

According to 3GPP TS 36.321 the main services and functions of the MAC (Medium Access Control) protocol layer for LTE include:
a) Mapping between logical channels and transport channels;
b) Multiplexing/de-multiplexing of MAC SDUs belonging to one or different logical channels into/from transport blocks (TB) delivered to/from the physical layer on transport channels;
c) Scheduling information reporting;
d) Priority handling between logical channels of one UE;
e) Priority handling between UEs by means of dynamic scheduling;
f) Transport format selection;
g) Padding and other functions.

The scheduling aspects c) and e) of the MAC functionality are of particular importance for this invention, as these are vital for the efficient mitigation of intra-SFN-Cluster interference.

The general architecture of a cellular communication network according to the state of the art is depicted in FIGS. 1, 2, 3A and 3B. FIG. 1 shows an example network architecture of an LTE communication system 10 where transmission points 20 are sub-divided into clusters, with two clusters being shown, cluster M 22 and cluster N 24. Each cluster is controlled by a respective resource control unit, $RCU_M$ 26 and $RCU_N$ 28. The RCUs are in turn controlled by a cluster management unit 30. FIG. 1 shows an infrastructure interface 32 (in case of LTE, this is the S1 interface) between the cluster management unit 30 and a mobile management entity, MME, 34, part of the core network.

In FIG. 2, the actual transmission point 20 (antennas or antenna arrays) on the network side is located at a base station 40. FIG. 2 shows the infrastructure interface 32 and an air interface 36 (in case of LTE, this is the Uu reference point). A protocol stack 38 for the air interface for each of a base station 40 and a mobile terminal 42 is also shown. Termination points of the various LTE protocol layers reside in the base station ("eNB") and the mobile terminal ("UE").

FIG. 3A shows an example network architecture of an LTE communication system with a Remote Radio Head (RRH) 44 serving as a transmission point. This RRH 44 is connected to a base station 46 (eNB) for example by means of directed wireless technology or fibre optics, while FIG. 3B shows an example network architecture of an LTE communication system with a Remote Radio Head (RRH) 48 connected to a pool 50 of virtual base stations (eNBs). In FIGS. 3A and 3B the actual transmission points (antennas or antenna arrays) on the network side are represented by Remote Radio Heads (RRHs) that are connected to the base station (or to a pool of base station computation resources) by means of an interface INTERFACE 1 which may be a wireless, wired, or optical interface. For instance, CPRI (common public radio interface) protocols may be used on INTERFACE 1. RRHs have become one of the most important subsystems of current new distributed base stations. The Remote Radio Head contains the base station's RF circuitry plus analogue-to-digital/digital-to-analogue converters, up/down converters and antennas. RRHs also have operation and management processing capabilities and a standardized interface to connect to the "rest" of the base station. RRHs make MIMO operation much easier compared to base stations that include RF circuitry, A/D converters etc. and that are connected to antennas via an analogue interface. RRHs also increase a base station's efficiency and facilitate easier physical location for gap coverage problems.

The protocol stacks for the air interface are also shown in FIGS. 3A and 3B as protocol stacks 60, 62 and 64. Termination points of the various LTE protocol layers except for the LTE physical layer, PHY, reside in both the base station ("eNB") and the mobile terminal ("UE"). In contrast to FIG. 2, at least parts of the LTE PHY layer terminates in the RRH. When looking from the UE's perspective, the counterpart of the PHY layer is located in the RRH, whereas the counterpart of layers above PHY is located in the eNB. INTERFACE 1 is for the exchange of base band signals, while an interface INTERFACE 2 is the actual air interface (antenna to antenna) that uses the resource grid (as described in the previous invention), modulation, and coding schemes of the LTE physical layer.

While in FIG. 3A the RRH is connected to a real physical base station, in FIG. 3B the RRH is connected to a pool of base station computation resources (also known as a "Cloud RAN").

It is to be noted that a meaningful positioning of the "local RCU" entity in the wireless communication system depends very much on the actual deployment scenario. More specifically, it depends on the topological network structure and the answer to the question whether RRHs or eNBs are used as transmission points (TPs). Furthermore it depends on whether real physical eNBs are deployed (as shown in FIG. 3A) or virtual eNBs (e.g., offered by a pool of eNB computation resources) are used (as shown in FIG. 3B).

It is further to be noted that in the context of the present invention, an eNB may either be a real (i.e. physical eNB) or a virtual eNB (i.e. an instance of an eNB computational resource offered by a pool of computation power). A Transmission Point (TP) may be a Remote Radio Head (RRH) as well as a "complete" base station.

For further understanding of the present invention, FIGS. 4A to 4C depict examples of different known network topologies suitable for the implementation of the invention. The term Transmission Point (TP) may represent (an antenna or an antenna array of) either a RRH or a real physical eNB. FIG. 4A shows an example of a "bus" topological network structure, FIG. 4B a "star" topological network structure and FIG. 4C, a mixed "bus" and "star" topological network structure.

SUMMARY OF THE INVENTION

The present invention provides a method of transferring resource control unit operational control functionality within a single frequency network from a first node to a second node according to claim 1.

An object of the method of the invention is to provide for a seamless exchange of RCU functionality/RCU context information (including the MAC scheduling aspects for intra-SFN-Cluster interference mitigation) from one entity to another entity as the corresponding SFN-Cluster moves, expands or shrinks).

The process of exchanging RCU functionality may comprise one or more of the following steps: selecting at least one candidate node, activating at least one candidate node, requesting information from the at least one candidate node, receiving a set of information from the at least one candidate node; evaluating the set of information received from the at least one candidate node, evaluating another set of information deduced by a first node, determining one candidate node as a second node, initiating the transfer of RCU context information from a first node to the second node (target node), transferring RCU context information fully or in part from a first node to the second node (target node), deactivating the first node. The order of the steps listed here was arbitrarily chosen; i.e. in real life deployments the various steps described here may be performed in a different order according to the respective scenario. Also, not all process steps listed here may be needed for the exchange of RCU functionality between entities.

In one embodiment the exchange of RCU functionality may comprise the exchange of RCU context information and in another embodiment the exchange of RCU context information may comprise the exchange of RCU Functionality.

Further aspects of the invention are provided according to the dependent claims.

INTRODUCTION TO THE DRAWINGS

Embodiments of the invention will now be described, by way of example only, with reference to the accompanying drawings in which:

FIG. 4A illustrates a bus network structure;

FIG. 4B illustrates a star network structure;

FIG. 4C illustrates a composite bus and star network structure;

PREFERRED EMBODIMENTS OF THE INVENTION

Figure 5A:
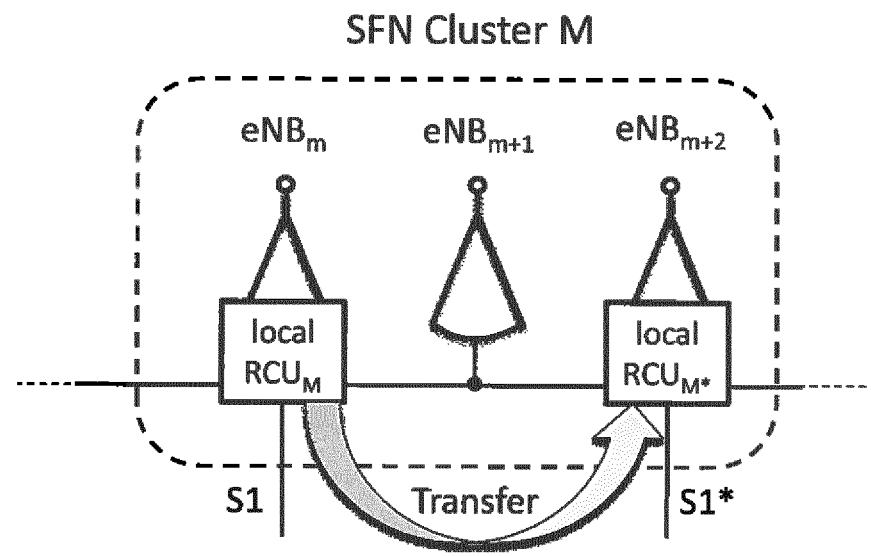
FIG. 5A illustrates an embodiment of the invention implemented in a bus topology cluster

FIG. 5A illustrates a transfer of RCU functionality within an SFN cluster M having a bus topology from one eNB, $eNB_m$, to a second eNB, $eNB_{m+2}$. In the transfer from one eNB to the other, the local resource control unit, RCU, functionality is also transferred.

Local $RCU_M$ denotes the resource control unit prior to the transfer, local $RCU_{M^*}$ denotes the resource control unit after the transfer. Likewise, the infrastructure interface between the Radio Access Network (RAN) and the Core Network (CN) prior to the transfer S1, and the infrastructure interface between the Radio Access Network (RAN) and the Core Network (CN) after the transfer S1* is changed.

From FIG. 5A one can see that the RCU functionality may be transferred over the two S1 reference points or over the bus connecting the eNBs within SFN-Cluster M.

Figure 5B:
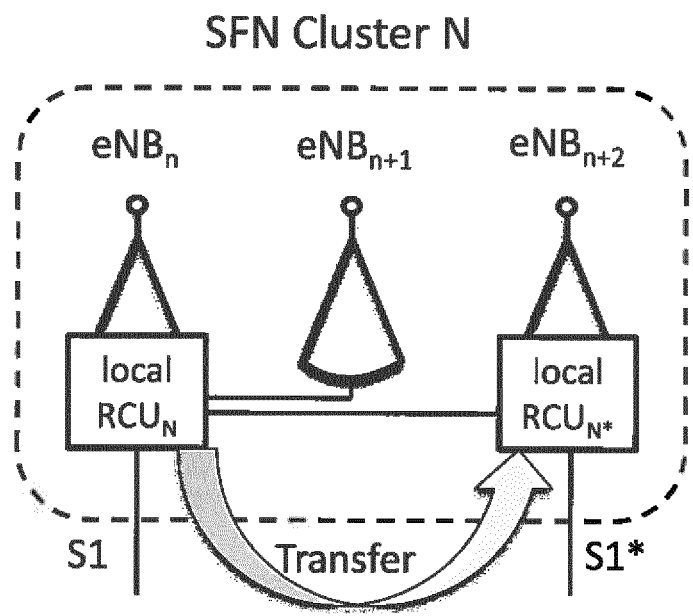
FIG. 5B illustrates an embodiment of the invention implemented in a star topology cluster.

From FIG. 5B one can see that the RCU functionality may be transferred over the two S1 reference points or over the direct connection between $eNB_n$ and $eNB_{n+2}$ within SFN-Cluster N. In case of a star topology as shown in FIG. 5B, the star topology needs to be formed anew after the successful transfer of RCU functionality (i.e. when $eNB_{n+2}$ holds the RCU function for SFN-Cluster N, the direct connection between $eNB_n$ and $eNB_{n+2}$ may be dropped, and a direct connection between $eNB_{n+2}$ and $eNB_{n+1}$ may need to be established. This depends on the actual deployment scenario and may not be possible in all cases.

Figure 6A:
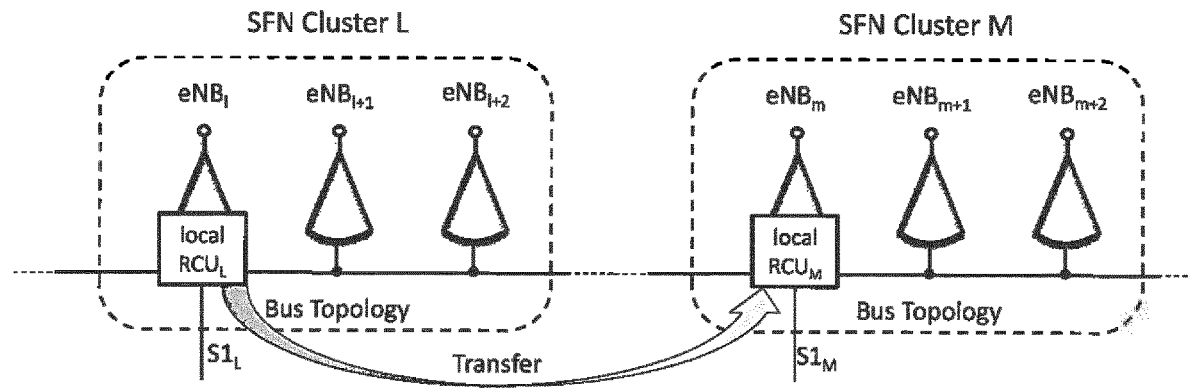
FIG. 6A shows a transfer of RCU functionality between local RCUs in a bus topology.
Figure 6B:
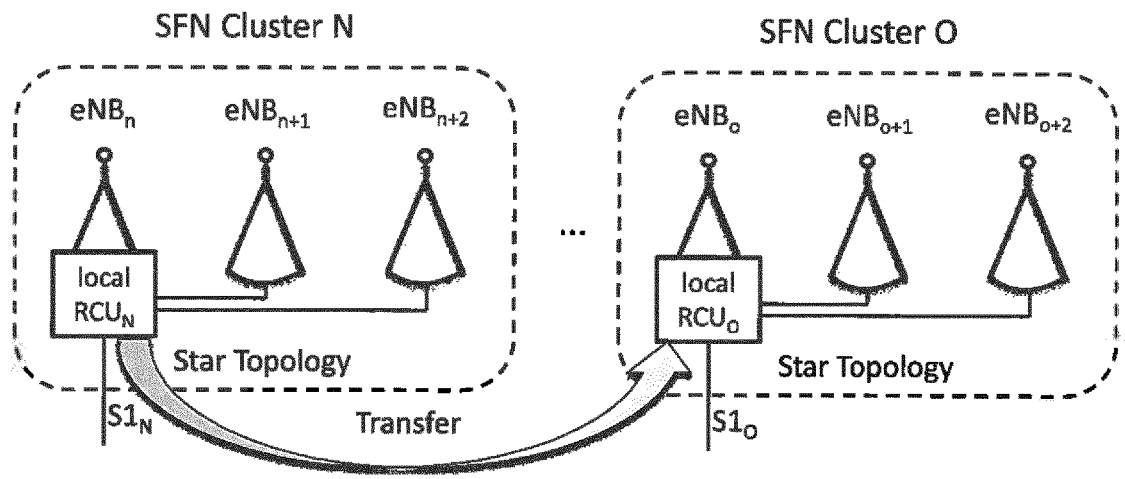
FIG. 6B shows a transfer of RCU functionality between local RCUs in a star topology.

The present invention also provides for the transfer of local RCU functionality from a first eNB of a first SFN-Cluster to a second eNB of a second SFN-Cluster (e.g., from $eNB_l$ to $eNB_m$ as shown in FIG. 6A, or from $eNB_n$ to $eNB_o$ as shown in FIG. 6B). Local $RCU_L$/$RCU_N$ denote the resource control units prior to the transfer, local $RCU_M$/

$RCU_O$ denote the resource control units after the transfer. Likewise, $S1_L/S1_N$ denote the infrastructure interfaces between the Radio Access Network (RAN) and the Core Network (CN) prior to the transfer, and $S1_M/S1_O$ denote the infrastructure interfaces between the Radio Access Network (RAN) and the Core Network (CN) after the transfer.

As in the example above, one can see from FIG. 6A that the RCU functionality may be transferred over the two S1 reference points or over the bus connecting SFN-Cluster L with SFN-Cluster M.

From FIG. 6B one can see that the RCU functionality may be transferred only over the two S1 reference points. Unlike in the example above, there is no direct connection between the different SFN-Clusters due to the given star topology.

Figure 7A:
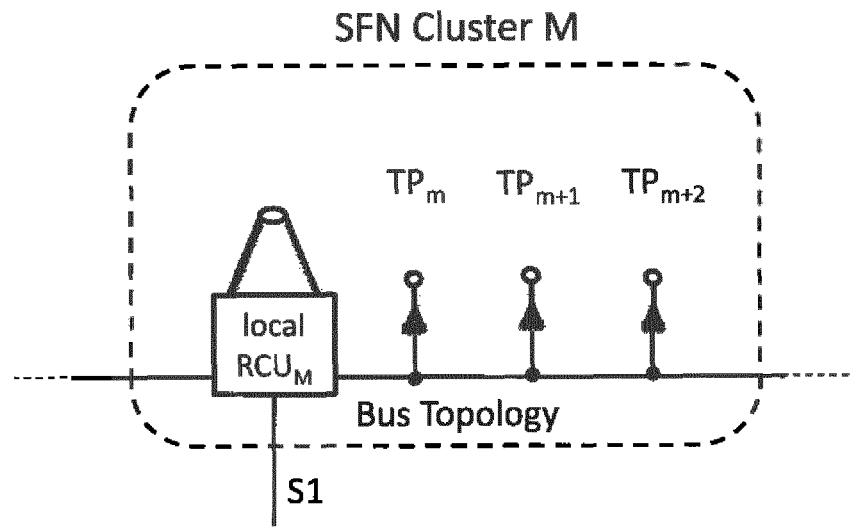
FIG. 7A shows an SFN cluster having a bus topology.
Figure 7B:
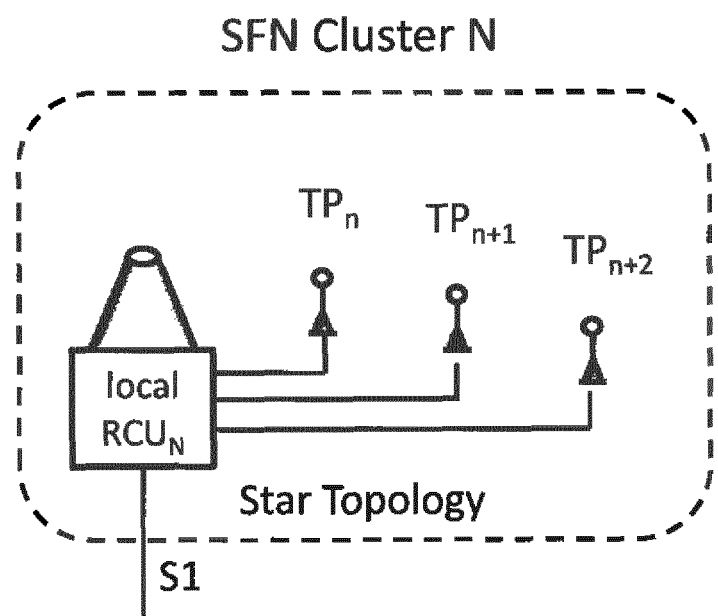
FIG. 7B shows an SFN cluster having a star topology.

As one can easily see from the FIGS. 7A and 7B transfer from a first eNB to a second eNB of the same SFN-Cluster is not needed due to the nature of RRH deployment.

The capability and/or suitability of an eNB to host/provide a local RCU functionality in any given SFN-Cluster needs to be known before transfer of RCU functionality is initiated. Additionally or alternatively, information about resource allocations (e.g., on the air interface offered by an eNB) and/or processing load (e.g., in the hardware of an eNB) and/or current configuration details (e.g., bandwidth configuration of an eNB) and/or local activity status (e.g., related to power saving modes in an eNBs) need to be known in some deployment scenarios.

Therefore, various pieces of information describing the capability and/or suitability of an eNB, collectively termed resource control information, are provided to the entity that triggers the RCU functionality transfer prior the first transfer. Provision of this data may be requested or deduced for instance by the first node (i.e. by the eNB that is currently providing the local RCU functionality for a specific cluster), or by a centrally located management unit (such as the SFN Cluster Management Unit).

Figure 8:
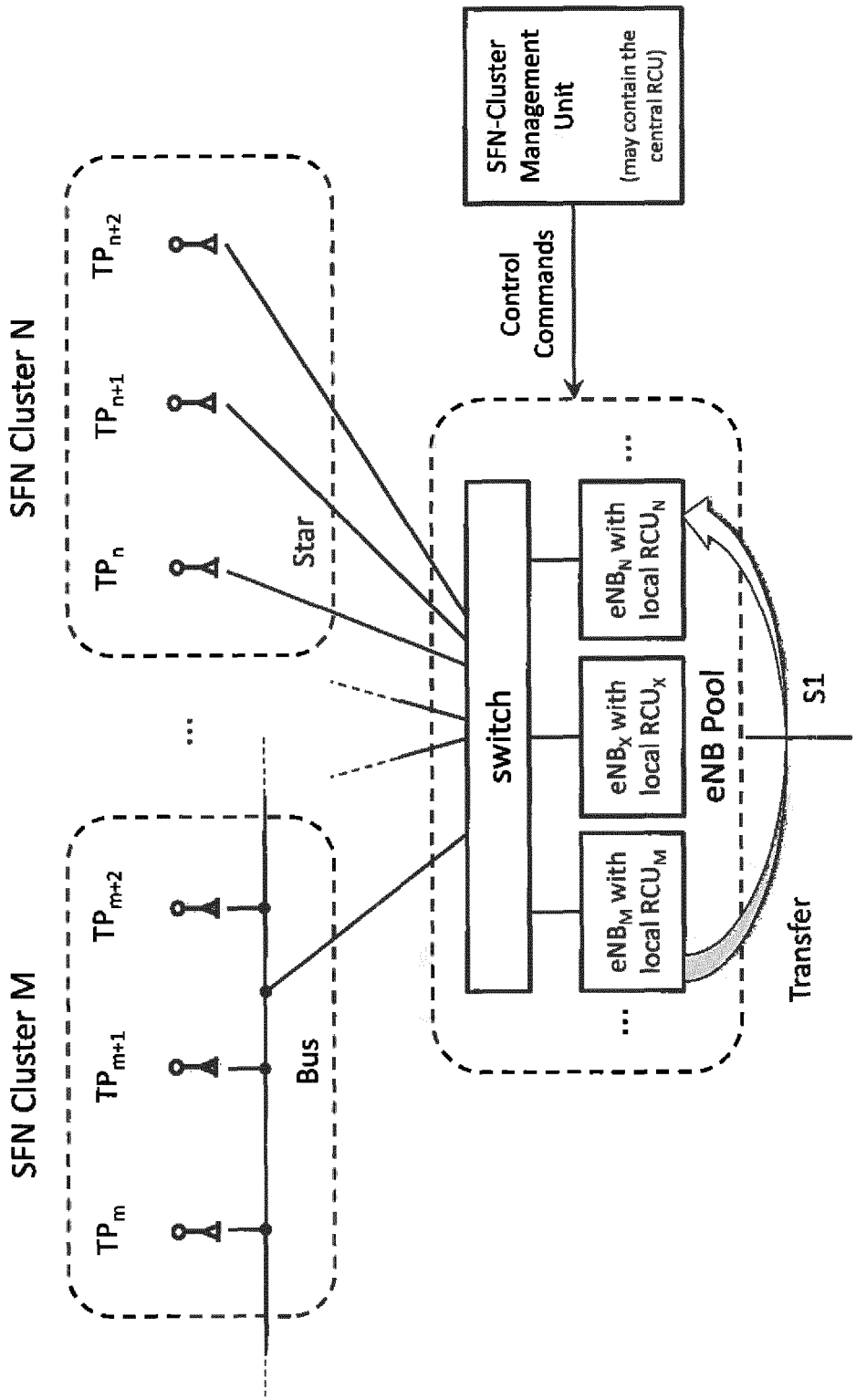
FIG. 8 illustrates a transfer from a first eNB to a second eNB.

Yet another aspect of the present invention is the propagation of local RCU functionality from a first virtual eNB controlling a first SFN-Cluster to a second virtual eNB controlling a second SFN-Cluster (e.g., from $eNB_M$ to $eNB_N$ as shown in FIG. 8). Local $RCU_M$ denotes the resource control unit assigned to $eNB_M$ prior to the transfer, local $RCU_N$ denotes the resource control unit assigned to $eNB_N$ after the transfer. In this scenario the handover of local RCU functionality from one virtual eNB to another virtual eNB is an "eNB Pool internal operation" and does as such not require any external interfaces for the exchange of context information.

FIG. 8 only shows an example deployment topology with SFN-Cluster M having a "bus" type topology and SFN-Cluster N having a "star" type topology. This should not be understood as a restriction in any case. In other scenarios both SFN-Clusters may have a "bus" topology, or a "star" topology. Also, the transfer of RCU context information between an eNB Pool made up of a number of virtual eNBs and a subsystem made up of a number of physical eNBs explicitly falls into the scope of the present invention. The latter is not shown here for the sake of brevity.

Figure 1:
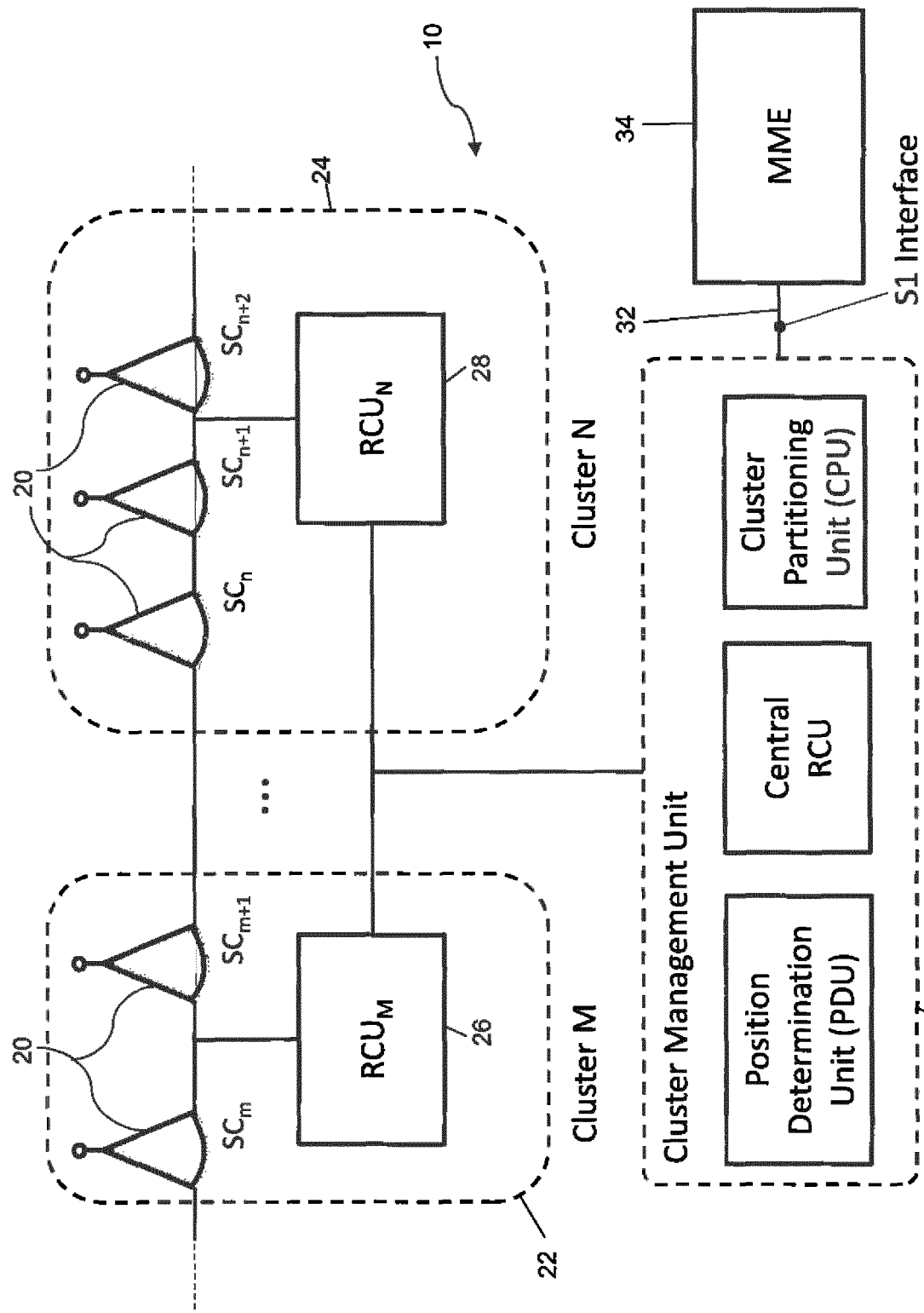
FIG. 1 is a schematic illustration of a single frequency network sub-divided into clusters.
Figure 2:
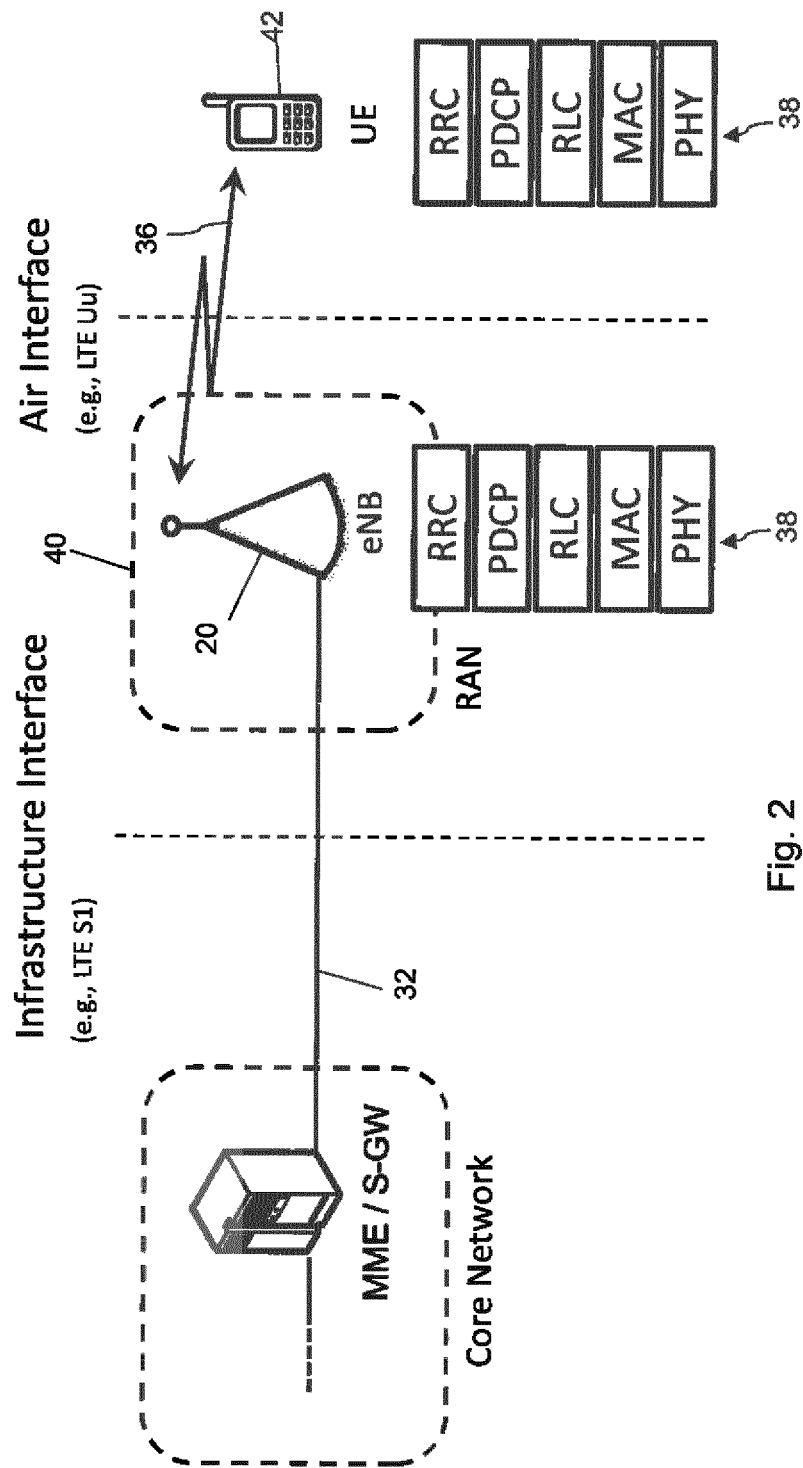
FIG. 2 shows an example network architecture of an LTE communication system.
Figure 3A:
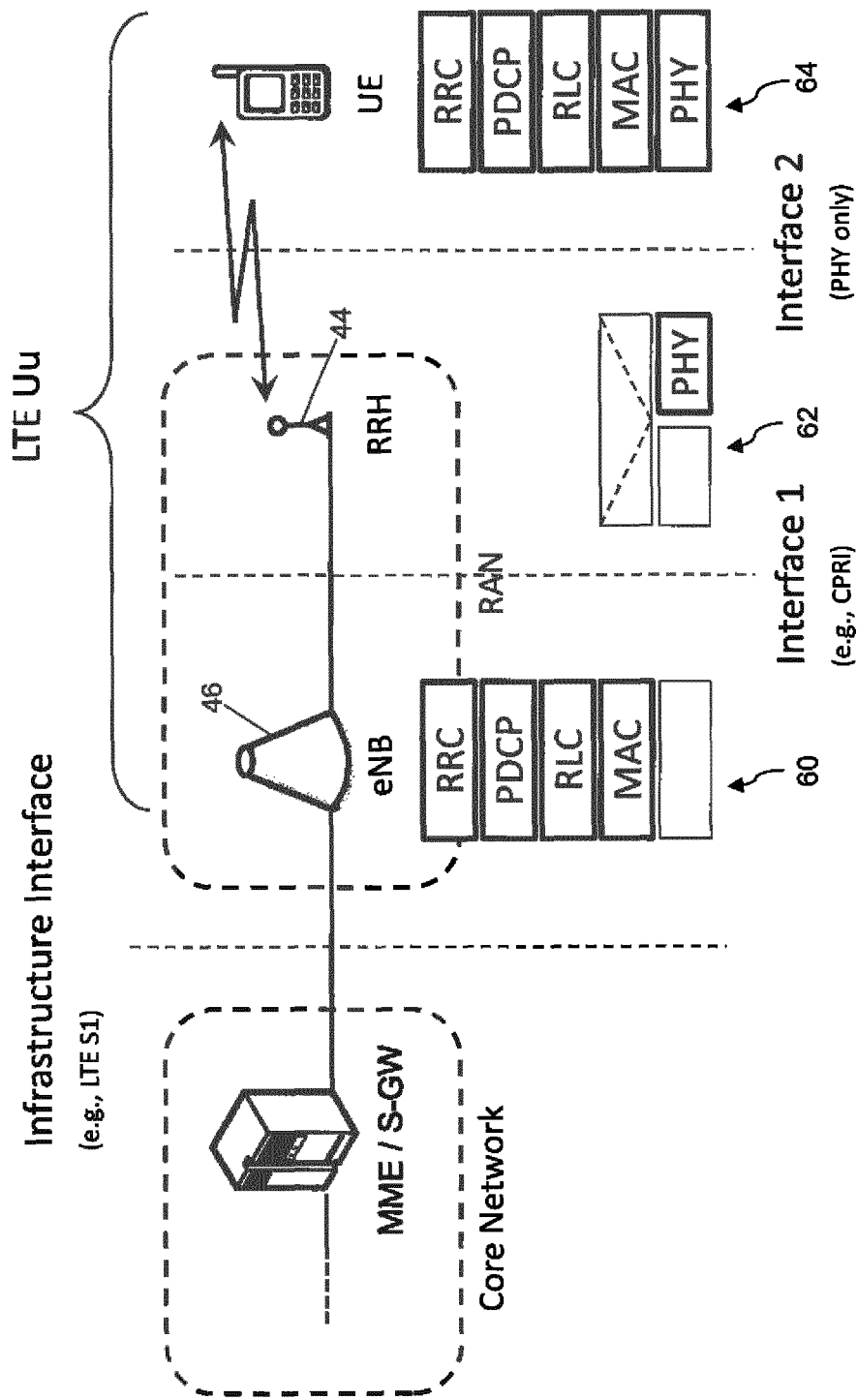
FIG. 3A shows an example network architecture of an LTE communication system with a Remote Radio Head.
Figure 3B:
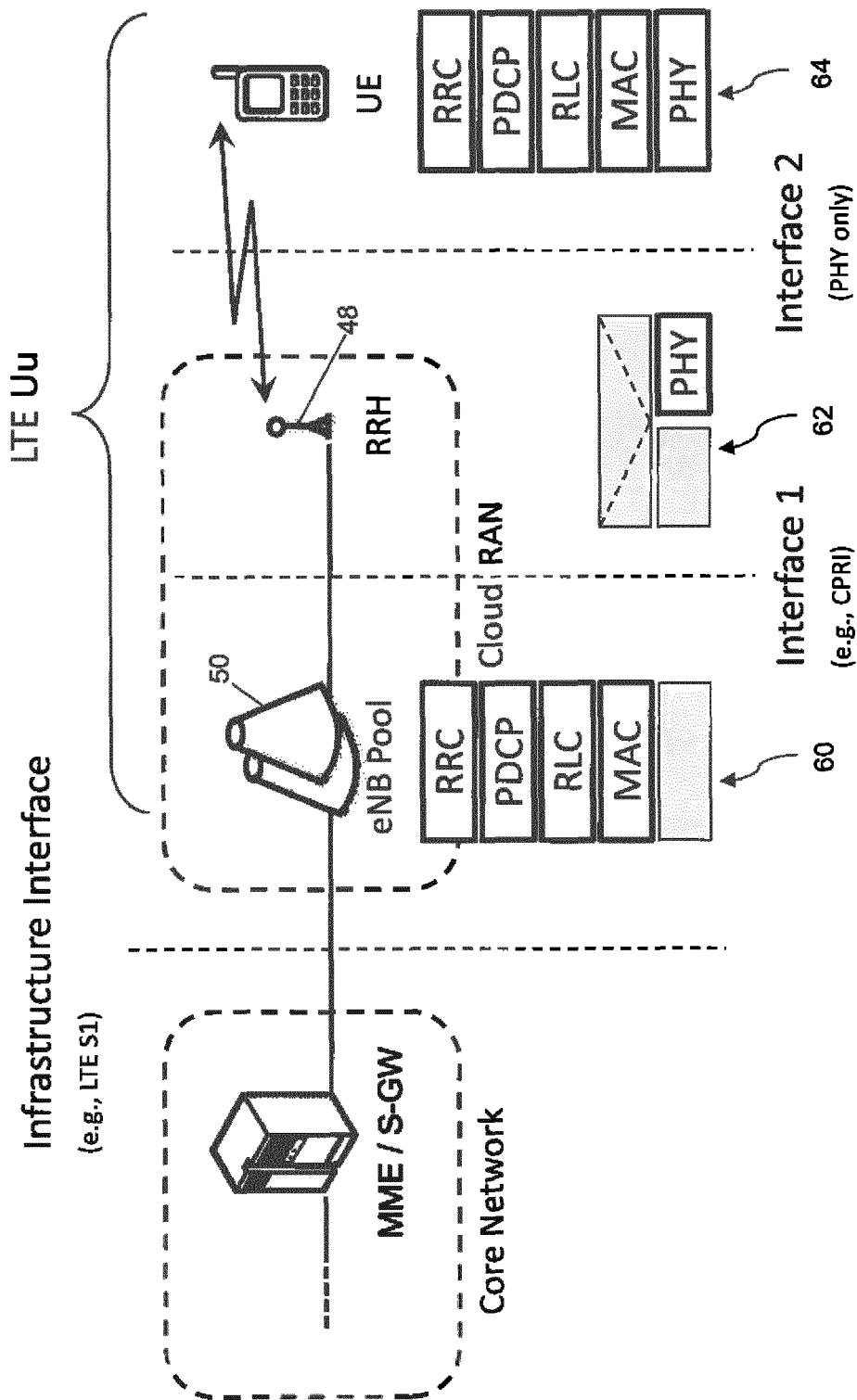
FIG. 3B shows a further example network architecture of an LTE communication system with a Remote Radio Head.

As depicted in FIG. 1 any local RCU serving a specific cluster is managed by a SFN Cluster Management Unit. This management unit defines the (at least one) SFN-Cluster(s) spanned by the network and served by the local RCUs as well as the users/devices that are connected to a particular SFN-Cluster.

The concept of SFN-Clusters and devices served by SFN-Clusters takes into account the geographical location, actual UE movements and/or expected trajectories of UEs as well as other aspects, including Availability and demand of resources in the local RCUs
  Necessary synchronization overhead, i.e. loss of resources due to SFN usage
  Expected live-time of the cluster, i.e. expected maintenance overhead An SFN-Cluster once established is a dynamic construction with the following parameters changing according to (local and global) needs:

Number of UEs served by the SFN-Cluster
  TP (RRHs and/or eNBs) forming the SFN-Cluster
  Resources managed by the (central) RCU to serve an SFN-Cluster
  The entity, that executes the function of the local RCU for a specific SFN-Cluster In contrast to this list, some parameters are managed locally by the local RCU without any interaction with centralized management functions. Examples are local resource management using the resources centrally allocated and local power up/down for TPs (RRH, eNBs) to increase energy efficiency of the cluster.

The decision which entity executes the local RCU function is done in the Central RCU within the SFN Cluster Management Unit. The decision is based firstly on capabilities of the available entities, i.e. not all entities are able or suited to execute the necessary function and ensure good performance. Secondly, the local RCU must be selected to have a good connection to all TPs within the cluster, i.e. short enough transfer delay to ensure synchronized behaviour of the SFN-Cluster and enough bandwidth to support all related UE's demand. Thirdly, depending on the deployment scenario in question, other criteria might be taken into account as well, such as resource allocation, processing load, bandwidth configuration details, and/or a particular node's activity status.

A logical but not mandatory decision is to give the local RCU function to one of the (capable) eNBs within the SFN-Cluster. However, due to the dynamics of the cluster as it is defined, the entity executing the local RCU function may be a sub-optimal choice after a period of time and finally it may not be able or suited to execute the function due to connection loss or decreased connection quality. Also, the entity may suffer insufficient computational resources or the entity may be the optimal choice to serve another cluster and thus has to give up serving its current cluster.

In another embodiment a particular node may be powered by solar panels. In this case, the node may become unsuited for executing the local RCU function when it is forced to enter a status of inactivity, e.g. at night-time.

In yet another embodiment only a part (or sub set) of the local RCU functionality is transferred from one entity (first node) to another entity (second node) based on the information received from the second (candidate) nodes and/or based on the information deduced by the first node itself.

The reasons described show the need of a function transfer between the current to a newly defined (target) entity. The final decision to transfer is done by the SFN Cluster Management Unit, however the trigger for the transfer may come from either of the local or central RCUs.

Well known measurements performed in the devices, e.g. inter cell measurements as known from legacy cellular networks (in this context better called "out of SFN measurements"), may help the RCUs to derive availability of TPs to be added to an SFN cluster and/or to be given the local RCU function.

Figure 9:
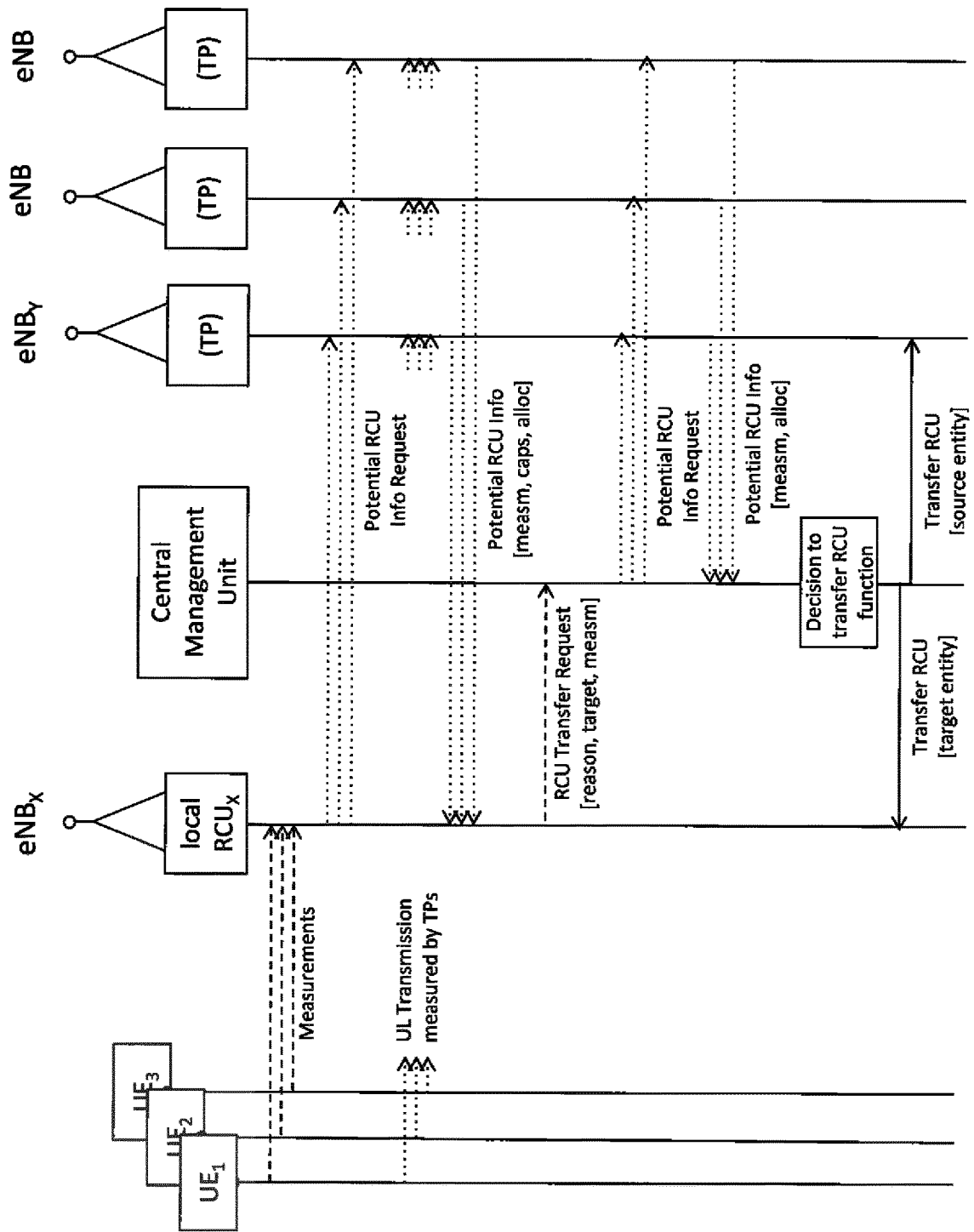
FIG. 9 shows a first message sequence chart.

FIG. 9 shows an exemplary message sequence chart in the upper part of which Pre-Transfer procedures are shown with an optional request by the local RCU to transfer the functionality (dashed line). This message may request transfer to a specific entity, e.g. an eNB that was measured by a sufficient number of UEs as being received very well. The transfer may also be requested without a requested target entity, e.g. to indicate decreasing quality of connection between RCU and one or more TPs.

The request may include measurements received from UEs in the cluster or measurement made by the local RCU itself. It may include single measurements or consolidated information derived from continuous measurements and observations.

An alternative is shown in FIG. 9 in dotted lines: The current local RCU may request directly one or more candidate entities, e.g. nearby eNBs that are currently part of a given cluster (as shown in FIG. 9) as well as nearby eNBs that are currently not part of the cluster, to measure UL signals transmitted by UEs in the cluster. The answer to this request from the other entities can contain measurement results and current capability information that informs about whether the entity can or cannot take over the RCU functionality of a cluster, optionally limited to a certain number of UEs, a maximum bandwidth or alike. Further information, such as current resource allocations and/or load indications, may also be part of the responses that are received from various nearby eNBs in order to determine whether these are suited for executing the RCU functionality.

For instance, the decision whether to transfer RCU functionality from one node to another node may be based on characteristics, such as:
- uplink measurements (e.g. performed on uplink channels by the base station);
- downlink measurements (e.g. performed on downlink channels by the mobile devices and reported thereafter);
- node capabilities;
- node configuration details;
- activity status;
- radio resource utilization;
- processing load.

A very similar request could alternatively be made from the SFN Cluster Management Unit (central management unit) after the request to transfer the RCU functionality has been received from the current local RCU. In this alternative example of FIG. 9 it is assumed that the SFN Cluster Management Unit has knowledge about the various nearby eNBs' capabilities, so there is no need to show the exchange of capability related pieces of information from the various nearby candidate nodes to the SFN Cluster Management Unit (central management unit).

Based on the requests, responses, and received feedback (such as measurements and/or location information and such like) the SFN Cluster Management Unit (central management unit) starts the function transfer by ordering source and target entity to transfer the respective local RCU functionality.

With this functional transfer the TPs that are part of the cluster do not necessarily change, i.e. if the source RCU was e.g. an eNB that also performed as a TP, the TP function can stay intact in order not to lose any information transmitted from or to the UEs. This is denoted "(TP)" in FIG. 9.

The local RCU of a cluster has several functions, e.g.
Function A: Distribution of DL data to TPs for synchronized transmission, i.e. either distribution over synchronized transport or distribution in conjunction with synchronization information, e.g. precise transmission timing
Function B: Combining and/or selection of UL data received by the different TPs, i.e. selection of respective reception node (from all TPs of a cluster) and combining of data from a single UE redundantly received by multiple TPs and forwarding to the NW
Function C: Resource Management, i.e. allocation of available resources that have been allocated to the cluster by the SFN Cluster Management Unit (central management unit) to the different UEs served within the cluster (dependant on UE-specific demand)
Function D: Local TP management, i.e. activation/deactivation of TPs for a better power efficiency and controlling TP's transmit power, that is combining power control information received in UL to derive power demands for the various TPs for DL.

A transfer of local RCU functionality means a seamless or near seamless transfer of the above functions between source and target nodes.

Function A.

To ensure successful DL data distribution during and after transfer, the network is preferably informed about the routing of traffic via the new local RCU. All traffic still received via the old route (via source local RCU) can be distributed to TPs as before the transfer or it could be forwarded to the target local RCU. Traffic via the target local RCU is preferably only distributed to the TPs after all leftover traffic has been sent by the source local RCU. In prior-art solutions (e.g. for inter eNB Handover in LTE or similar change of network node for a single UE data route) the source node forwards traffic to the target node for transmission to the UE. The last forwarded packet may contain an end-marker that indicates the end of the forwarded (old) data and thus starts the new data distribution by the target node.

The special requirement for the current SFN cluster solution is the synchronized distribution of data packets.
- If the nature of the distribution from RCUs to TPs is of synchronized manner, i.e. the distribution of data packets is timely bound to the transmission of the data on the air interface by the TPs, then the switch of the distribution function has to be exactly synchronized. That requires both source and target RCU to define a point in time (on a common time basis) on which source stops and target starts to distribute and a preparation phase has to ensure the target can start at that time.
- If the distribution from RCUs to TPs is done unsynchronized, i.e. the distribution of data packets includes exact timing information for each packet to be transmitted by the TPs, then the switching point in time may be agreed between source and target RCUs and both can start execution unsynchronized with the target distributing packets for transmission only after the switching point and the source RCU distributing only before that point in time.
- Both of these functions are regardless of whether data forwarding is used, i.e. also after the switching of the distribution function data forwarding from source to target RCU can occur.

Function B.

To ensure successful transfer of the UL data combination and TP selection the TPs of a cluster have to be informed about the local RCU change. The requirements for switching the route in a TP from source to target RCU are relatively relaxed as the source can continue its UL functions as long as there is data distributed. The only situation that has to be prevented is one TP sending its UL data to the source and one sending the same data to the target RCU that may lead to duplication of data in the UL data stream towards the NW. The solution here is similar to the DL: a synchronized switch or (to relax timing issues in the TPs) a data forwarding, e.g. from source to target RCU, and combination only in one of the RCUs.

Function C.

For successful transfer of the resource allocation function the target RCU has to be provided with the resource pool that is allocated to the SFN cluster. The most likely solution for this is the provision of resources from the central SFN cluster management unit as it is responsible for the overall resource pool allocation (including inter-SFN cluster interference aspects). An alternative is the forwarding of the current allocation from the source Local RCU. Any context information that is related, i.e. UE specific context about resource demand, subscribed service, capabilities, link quality and alike should be transferred as well to enable the target Local RCU to perform local resource allocation optimally.

The current DL resource allocation has to be transferred well in advance to the actual data distribution over the related resources by the target Local RCU to ensure the target Local RCU can select the appropriate resource from the start of its DL distribution. The UL resource allocation has to be known by the target Local RCU as well in order to map received data to the correct source UE. The target Local RCU can at every time after that allocate UL resources from the resource pool according to its own allocation strategy.

Function D.

Transfer of the local TP management (and some function previously mentioned) requires first of all knowledge about the TPs that belong to a cluster. That is information required by the target RCU along with the current status of TPs, i.e. on or off, and potentially the UE-specific relation of a TP, i.e. whether a TP that is generally "on" is required to transmit to and receive from a specific UE. Some TPs of a cluster may be turned "quiet" for distribution to UEs that receive with sufficient quality from other TPs and respectively for the UL transmission from the UEs. This information has to be exchanged either from the source Local RCU or from the Central RCU (or both, when the information transfer to the target Local RCU is split between the two). The TP management in general has relaxed time and synchronization requirements compared to the transfer demands in Functions A. to C.

Figure 10:
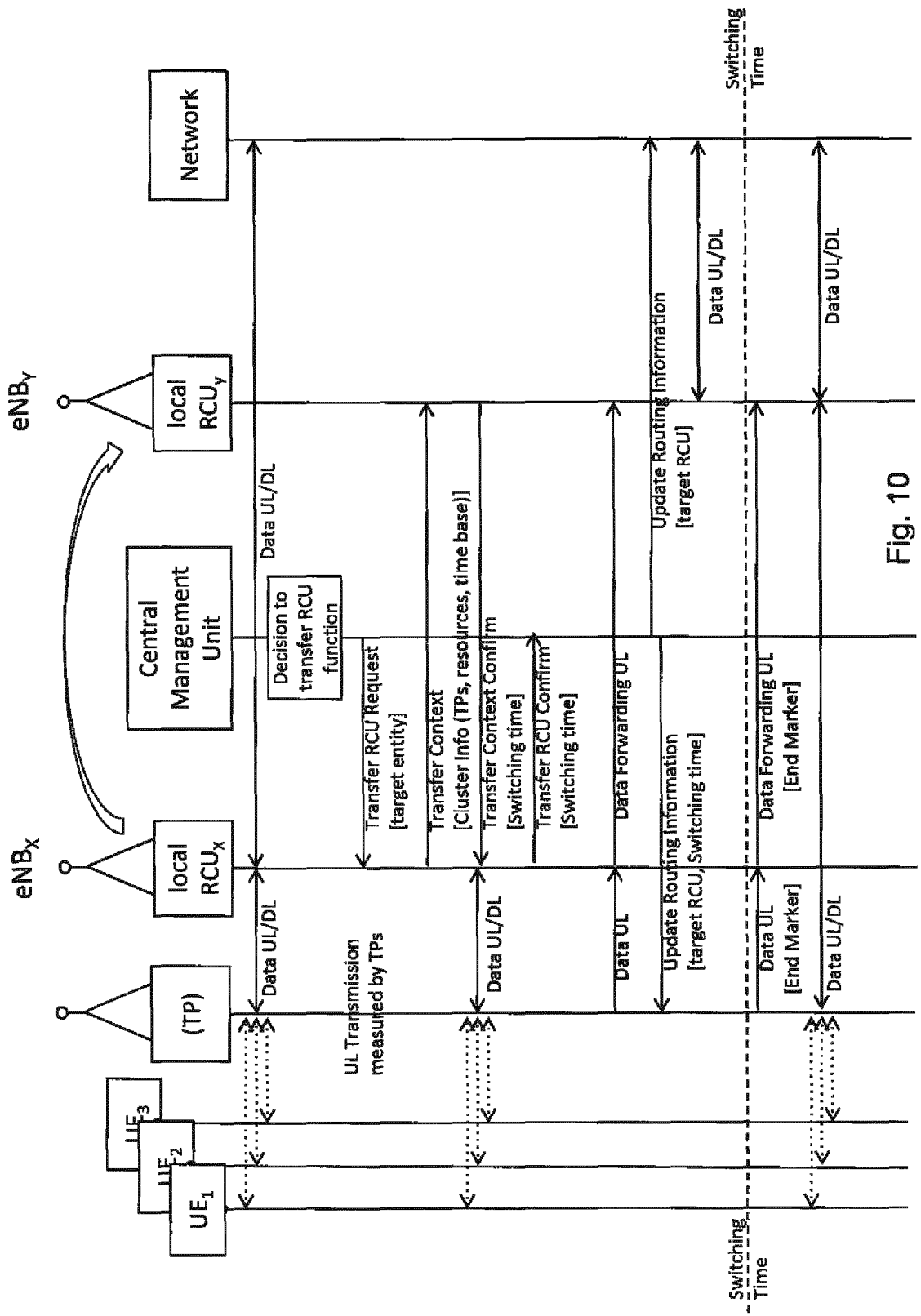
FIG. 10 shows a second message sequence chart.

FIG. 10 shows the information exchanged explained above in a message sequence chart that uses example messages between the different entities for exchange of the information. The message may however also be exchange in different order. Also, more or less messages may be used.

In FIG. 10 the target Local RCU ($RCU_y$) is informed by the source Local RCU about the functionality transfer. An alternative was shown in FIG. 9 where both source and target Local RCUs were informed by the SFN Cluster Management Unit (central management unit). In the shown example, the routing information is updated in the TPs (only one shown) and the network basically at the same time by the central management unit. The air interface between UEs and the TPs is not touched at all by the transfer but the UL traffic arriving at the source Local RCU before routing is updated will be forwarded to the target Local RCU in order to prevent data duplication. An end marker marks the end of data forwarding so that the target Local RCU can start DL data transmission towards the TPs. Other examples with other timing relation of messages could be shown, so FIG. 10 is only one out of many possible examples.

Table 1 shows the information elements which may be included in the content of the "Transfer Context" message (as shown in FIG. 10 above) and whether they are to be considered as "mandatory", M, or "optional", OP.

TABLE 1

| Information Element | Description | Presence |
|---|---|---|
| Originator RCU ID | Identifying the source Local $RCU_X$. | M |
| Recipient RCU ID | Identifying the target Local $RCU_Y$. | M |
| MME ID | MME to be used by the target Local $RCU_Y$. | OP |
| S-GW ID | S-GW to be used by the target Local $RCU_Y$. | OP |
| SFN-Cluster ID | Containing the cluster identifier of the respective SFN Cluster. | M |
| Context Transfer Type | Can be one of the following: Synchronized; Unsynchronized; etc. | M |
| Synchronization Information | Timing information used to ensure/achieve synchronization between $RCU_Y$ and $RCU_X$. | M |
| Switching Time | Point in time when the transition from source Local RCU to target Local RCU is supposed to happen. This may be a relative or absolute point in time. | M |
| Duration | May be used to inform $RCU_Y$ about the projected duration of the operation, and can be one of the following: time span; unlimited; etc. | OP |
| Ping-Pong Prevention | May be used to specify a time span in which the context must not be returned to source Local $RCU_x$. Alternatively, a simple flag "return of context not allowed" may be used. | OP |
| UL Resource Information | Can be one of the following: same resources as currently being used by $RCU_X$; $RCU_Y$ is free to decide about resource allocation; etc. | M |
| DL Resource Information | Can be one of the following: same resources as currently being used by $RCU_X$; $RCU_Y$ is free to decide about resource allocation; etc. | M |
| UE Specific Information | Can be one of the following: resource demands; QoS demands; type(s) of subscribed service(s); capabilities; link quality; etc. This information element may be a container with multiple entries, as "UE specific information" applies per UE. | OP |
| TP Specific Information | Can be one of the following: activity status; UE-specific relation to a TP; capabilities; etc. This information element may be a container with multiple entries, as "TP specific information" applies per TP. | OP |
| Refresh Cycle | Refresh pattern used by the Central RCU to provide Local RCUs with their individual resource pool configurations. | M |

TABLE 1-continued

| Information Element | Description | Presence |
|---|---|---|
| Lifetime | Remaining lifetime of resource allocation currently being used by source Local RCU$_X$. | M |

The skilled person will realise that further information elements are possible.

After the transfer of functionality is completed the source local RCU can delete all context about the respective SFN-Cluster. The target local RCU can start managing the SFN-Cluster by allocating resources etc.

The target local RCU may remember the source local RCU in a list of recent local RCUs for that SFN-Cluster in order to prevent a switching back to the same local RCU if measurements from UEs indicate so. Prevention of a so called "ping-pong effect" for transfer of local RCU functionality is important to guarantee efficiency of the system.

The invention claimed is:

1. A method of transferring resource controller operational control functionality within a single frequency network from a first node to a second node, the method comprising:
receiving at a resource controller a set of resource control information from at least one candidate node;
determining using the resource control information a suitability of the at least one candidate node to be the second node; and
initiating transfer of the resource controller operational control functionality from the first node to the second node, the resource controller operational control functionality including providing air interface medium access control of the multiple transmission points of the single frequency network such that the multiple transmission points transmit identical downlink data packets in a synchronized manner.

2. The method of claim 1, wherein at least one of the following is performed in advance of receiving the set of resource control information from the at least one candidate node:
selecting the at least one candidate node;
activating the at least one candidate node; or
requesting information from the at least one candidate node.

3. The method of claim 1, wherein following the initiating transfer of the resource controller operational control functionality from the first node to the second node, the first node is deactivated.

4. The method of claim 1, wherein the determining the suitability of the at least one candidate node to be the second node comprises analyzing the resource control information from a list of sets comprising:
a set of information deduced by the first node, and
a set of information provided by at least one candidate node.

5. The method of claim 1, wherein the resource control information is a set of information comprising at least one item of information selected from a list comprising:
uplink measurements;
downlink measurements;
node capabilities;
node configuration details;
activity status;
radio resource utilization; and
processing load.

6. The method of claim 1, wherein the method is controlled by a central management controller.

7. The method of claim 1, wherein the method is performed either entirely or partially by a central management controller.

8. The method of claim 1, wherein only a part of the resource controller operational control functionality is transferred from the first node to the second node.

9. The method of claim 1, wherein the first node is associated with a first cluster of the multiple transmission points and the second node is associated with a second cluster of the multiple transmission points.

10. The method of claim 1, wherein the identical downlink data packets are distributed from the resource controller to the multiple transmission points in the synchronized manner such that a transmission time of the identical downlink data packets on an air interface is bound to the distribution of the identical downlink data packets from the resource controller and wherein the first node stops distributing the identical downlink data packets and the second node starts distributing the identical downlink data packets at a selected point in time.

11. The method of claim 1, wherein the identical downlink data packets are distributed from the resource controller to the multiple transmission points in an unsynchronized manner and wherein a switching time point is agreed between the first node and the second node with the second node distributing the identical downlink data packets only after the switching time point and the first node distributing the identical downlink data packets not after the switching time point.

12. A mobile communication system for transferring resource controller operational control functionality within a single frequency network from a first node to a second node, comprising:
a resource controller configured to:
receive a set of resource control information from at least one candidate node,
determine using the resource control information a suitability of the at least one candidate node to be the second node, and
initiate transfer of the resource controller operational control functionality from the first node to the second node, the resource controller operational control functionality including providing air interface medium access control of the multiple transmission points of the single frequency network such that the multiple transmission points transmit identical downlink data packets in a synchronized manner.

13. A central management controller configured to control a resource controller, comprising:
the resource controller configured to:
receive a set of resource control information from at least one candidate node,
determine using the resource control information a suitability of the at least one candidate node to be a second node, and initiate transfer of the resource controller operational control functionality from a first node to a second node, the resource controller operational control functionality including providing air interface medium access control of the multiple transmission points of the single frequency network such that the multiple transmission points transmit identical downlink data packets in a synchronized manner.

\* \* \* \* \*